(12) United States Patent
Gentry (10) Patent No.: US 11,148,086 B1
(45) Date of Patent: Oct. 19, 2021

(54) POLLUTION CONTROL SYSTEM

(71) Applicant: Leslie A. Gentry, Hillsboro, MO (US)

(72) Inventor: Leslie A. Gentry, Hillsboro, MO (US)

( * ) Notice: Subject to any disclaimer, the term of this patent is extended or adjusted under 35 U.S.C. 154(b) by 236 days.

(21) Appl. No.: 16/389,514

(22) Filed: Apr. 19, 2019

Related U.S. Application Data (60) Provisional application No. 62/660,427, filed on Apr. 20, 2018.

(51) Int. Cl.
| | | |
|---|---|---|
| *B01D 41/04* | (2006.01) | |
| *C02F 1/00* | (2006.01) | |
| *B08B 13/00* | (2006.01) | |
| *B08B 3/02* | (2006.01) | |
| *C02F 101/32* | (2006.01) | |
| *A47J 36/38* | (2006.01) | |
| *B01D 45/08* | (2006.01) | |

(52) U.S. Cl.
CPC .............. *B01D 41/04* (2013.01); *B08B 3/026* (2013.01); *B08B 13/00* (2013.01); *C02F 1/001* (2013.01); *A47J 36/38* (2013.01); *B01D 45/08* (2013.01); *C02F 2101/32* (2013.01)

(58) Field of Classification Search
CPC ........... B01D 41/04; B08B 3/02; B08B 3/022; B08B 3/024; B08B 3/026; B08B 13/00; B08B 15/02; B08B 15/026; B08B 15/04; B08B 3/006; B08B 3/28; B08B 3/14
USPC .. 134/104.2–104.4, 166 R, 167 R, 172, 186, 134/198–200
See application file for complete search history.

(56) References Cited

U.S. PATENT DOCUMENTS

| | | | | | |
|---|---|---|---|---|---|
| 1,511,825 | A | * | 10/1924 | Burns ..................... | A47L 15/06 134/94.1 |
| 4,886,081 | A | * | 12/1989 | Blaul ...................... | B08B 3/006 134/18 |
| 4,993,199 | A | * | 2/1991 | Hughes ................... | B24C 9/00 134/104.4 |
| 5,093,079 | A | * | 3/1992 | Bakaitis ................. | A61B 90/70 134/150 |
| 5,253,993 | A | * | 10/1993 | Birkenstock ............. | B01J 25/02 100/72 |
| 5,419,349 | A | * | 5/1995 | Swain ..................... | B08B 3/022 134/104.4 |
| 5,954,070 | A | * | 9/1999 | Abad ...................... | B08B 3/006 134/104.2 |
| 2008/0190452 | A1 | * | 8/2008 | McMillen ............... | B08B 3/026 134/10 |
| 2012/0125364 | A1 | * | 5/2012 | Wiley .................... | B08B 9/0936 134/10 |
| 2014/0157739 | A1 | | 6/2014 | Alexander | |
| 2014/0209130 | A1 | | 7/2014 | Runge et al. | |
| 2016/0114360 | A1 | | 4/2016 | McMenamin | |
| 2017/0001204 | A1 | | 1/2017 | Peterson et al. | |
| 2017/0203337 | A1 | * | 7/2017 | Luo ........................ | B08B 15/026 |

* cited by examiner

*Primary Examiner* — William V Gilbert
(74) *Attorney, Agent, or Firm* — Grace J. Fishel (57) ABSTRACT

A wash hood for a baffle-type grease filter and a pollution control system for cleaning baffle-type grease filters outside or inside without contaminating the environment or soaking the operator with cleaning solution. The hood includes ridges on the inside for supporting the filters at an angle to a rear wall. A channel around the ridges guides the effluent towards a drain hole. A separator box with a filter connected to the drain hole separates the grease from the water such that the water may be discharged into a mop sink connected to a sanitary sewer system.

8 Claims, 12 Drawing Sheets

POLLUTION CONTROL SYSTEM

BACKGROUND OF THE INVENTION

Field of the Invention

The present invention relates to a system for the proper treatment of greasy wastewater from washing commercial kitchen grease filters.

Brief Description of the Prior Art

Baffle-type grease filters are commonly used in commercial kitchens for removing entrained grease, combustion products, fumes, smoke, and odors from a flow of air typically in an exhaust hood, extractor hood, or range hood. The baffle-type filters force the air to move through a series of baffles making a series of 180-degree turns, causing the grease and particulate material to be deposited in the bends of the baffles. The grease and particulate material if unremoved over a cooking surface is a fire hazard and for that reason baffle-type grease filter cleaning in a commercial kitchen should occur once a day or every other day.

Baffle-type grease filters may be placed in an industrial dishwasher or washed by hand using water and chemicals known in the commercial kitchen industry. Hand washing is unsafe for personnel and damaging to filters, shortening their operating life. Running the baffle-type grease filters through dishwashers is unsafe for health and hygiene reasons due to the rancid grease stuck on them. This waste gets into the dishwashers's jets which may then come out on serving dishes as most establishments run their serving dishes and baffle-style filters through the same dishwashers.

Because neither hand washing or running the baffle-type grease filters through dishwashers is attractive, in reality a majority of the cleaning personnel (either professionals or commercial kitchen employees) wash their filters by taking them outside with no means of containing the water or grease. While not a great alternative, it is preferred by workers to the only other two means available.

NFPA Code 96: 11.4, 11.6.1, 11.62 as of the filing date requires that kitchen cleaning personnel apply a degreaser and then wash the filters with water over a containment tank to capture all waste generated. Proper disposal of the waste water is through a grease trap.

Washing the baffle-type grease filters outside violates NFPA Code 96 and it also violates the EPA Clean Water Act, as all of the grease and waste water flows into storm sewers or remains on the ground and becomes run-off, both of which result in polluting of our waterways, rivers, streams (See FIG. 11) or sewer systems.

BRIEF SUMMARY OF THE INVENTION

In view of the above, it is an object of the present invention to provide a pollution control system for use by commercial kitchens. It is another object to provide a pollution control system that allows baffle-type grease filters to be cleaned inside or outside without contaminating the environment or wetting the operator. Other objects and features of the invention will be in part apparent and in part pointed out hereinafter.

In accordance with the invention, a wash hood for a baffle-type grease filter comprises an enclosure having a front wall, a rear wall, sidewalls, a floor and a ceiling, said front wall sloped towards the rear wall and having a framed opening configured to allow insertion of at least one baffle-type grease filter to be cleaned into the enclosure. There are a plurality of spaced apart ridges on the floor, each of said ridges having an inverted L-shape with a first flat surface aligned with the framed opening against which a baffle-type grease filter may be leaned, said spaced apart ridges spaced from the front wall, the rear wall and the sidewalls for channeling effluent around the spaced apart ridges; and, a drain hole positioned in the floor for receiving effluent channeled around the spaced apart ridges for disposal.

In other cases, the framed opening of the wash hood is wider along the floor than the sidewalls and ceiling for retaining effluent inside the housing. In a further aspect, the ridges have an inverted L-shape with legs extending along a length of the ridge at an angle of substantially 70 degrees.

In one embodiment the ridges are about 22 inches long and the are spaced about 4 inches from the front wall, the rear wall and the sidewalls for channeling effluent around the spaced apart ridges. In a preferred form, the first ridge is spaced 3½ inches from the rear wall, a second at 6½ inches and a third at 10 inches.

For some applications the enclosure and ridges are formed of stainless steel.

In some implementations, the wash hood is coupled with a separator box for effluent coming from the wash hood. An embodiment of the separator box comprises an enclosure with sidewalls, a bottom and a top, an inlet port in the top connected to the drain hole in the wash hood, and a filter adjacent an outlet port for separating the grease and particulate material in the effluent.

For other applications, the inlet of the separator box is at a first end of the box and the outlet is at a second end of the box, with a baffle attached to the sidewalls forming a flow channel between the baffle and the bottom. In some embodiments, a filter is provided in a space between the baffle and the outlet port.

Various aspects of the invention are summarized above and are shown in the constructions hereinafter described.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
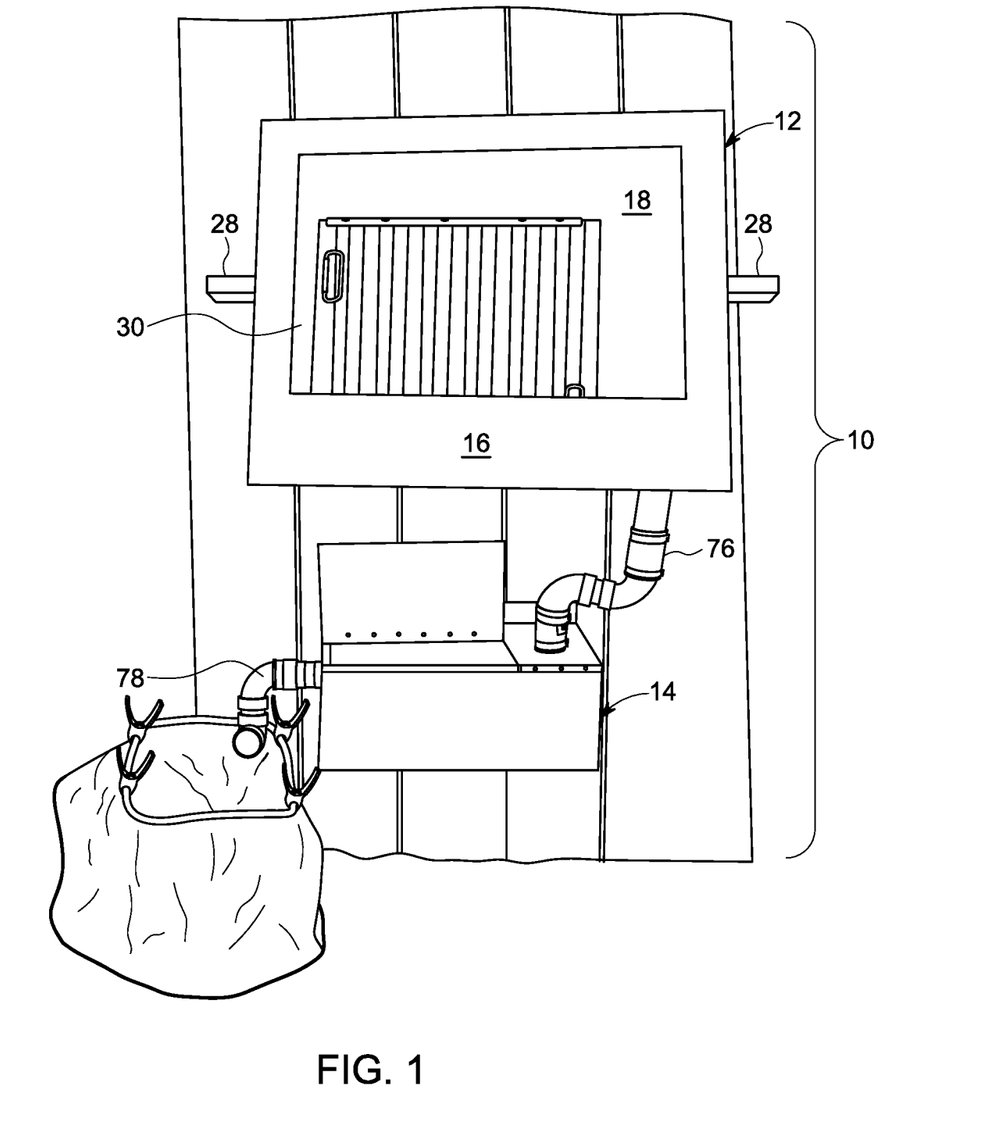
FIG. 1 is a front view of a pollution control system which may be used inside or outside including a wash hood and a separator box in accordance with the present invention.

Referring to the drawings more particularly by reference character, reference number 10 refers to a pollution control system comprising a wash hood 12 and a separator box 14 as shown in FIG. 1. Turning next to FIGS. 3 and 4A-4D, wash hood 12 comprises an enclosure having a front wall 16, a rear wall 18, sidewalls 20, a floor 22 and a ceiling 24. Front wall 16 is sloped towards rear wall 18 and includes a framed opening 26. A shown, the frame along floor 22 is wider than along sidewalls 20 or ceiling 24 for retaining effluent inside the enclosure as more particularly described below. Handles 28 are provided on the outer face of sidewalls for easy placement of wash hood 12.

With continuing reference to FIGS. 3 and 4A-4D, front wall 16 is 30" long and 25" high. The base of sidewalls 20 is 16", the top is 8", vertical edge is 24" and sloped edge is 25". Ceiling 24 measures 8" wide and 30" long. The enclosure is formed of stainless steel to resist corrosion with the side edges of front wall 16, rear wall 18, sidewalls 20 and floor 22 welded together to form a water tight seal. Frame opening 26 is configured to allow insertion of at least one baffle-type grease filter 30 and for this purpose is 25" long and 17½" inches high. The frame is 2½" wide along sidewalls 20 and ceiling 24. Along floor 22, the frame is 5" wide.

Figure 4A:
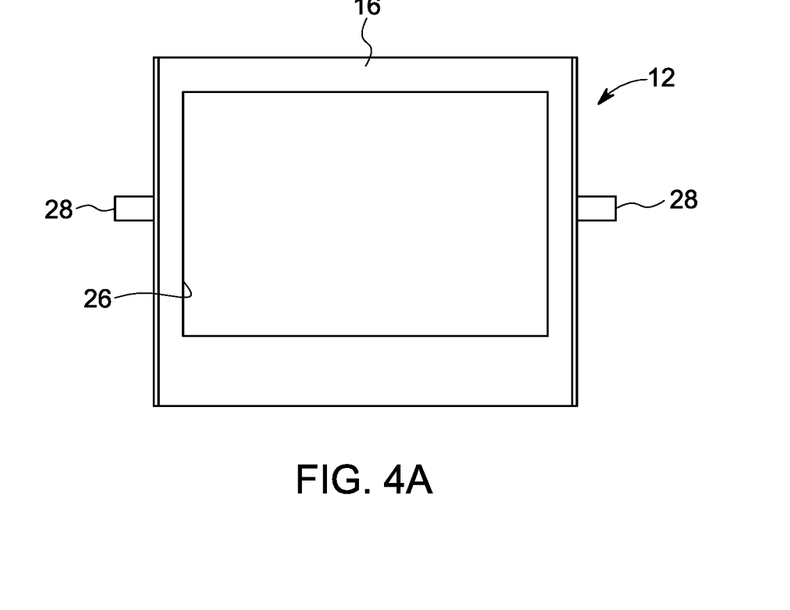
FIG. 4A is a front view of the wash hood.
Figure 4B:
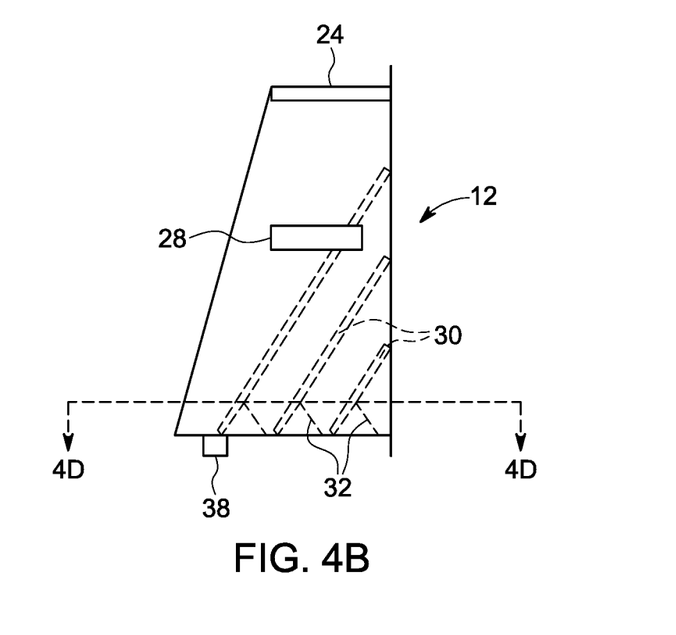
FIG. 4B is a side view of the wash hood.
Figure 4C:
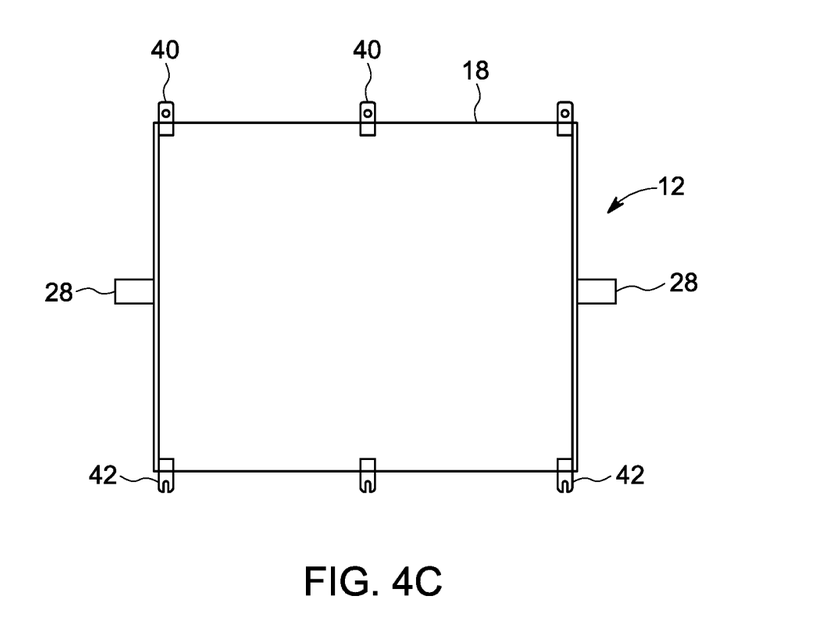
FIG. 4C is a rear view of the wash hood.
Figure 4D:
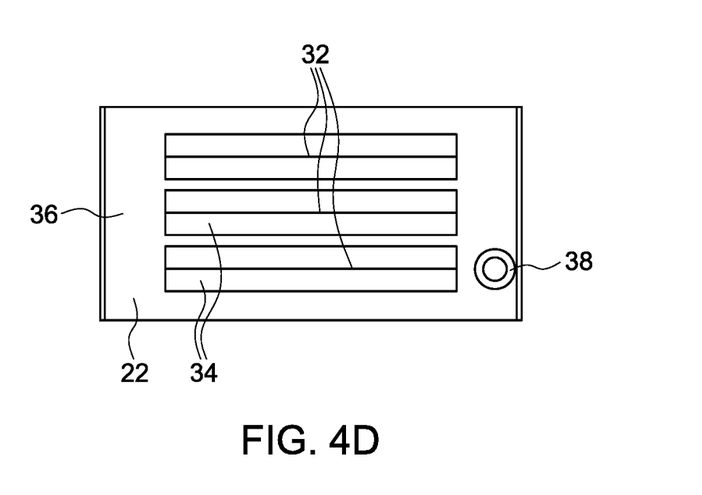
FIG. 4D is sectional view taken along the plane of 4D-4D in FIG. 4C.
Figure 5:
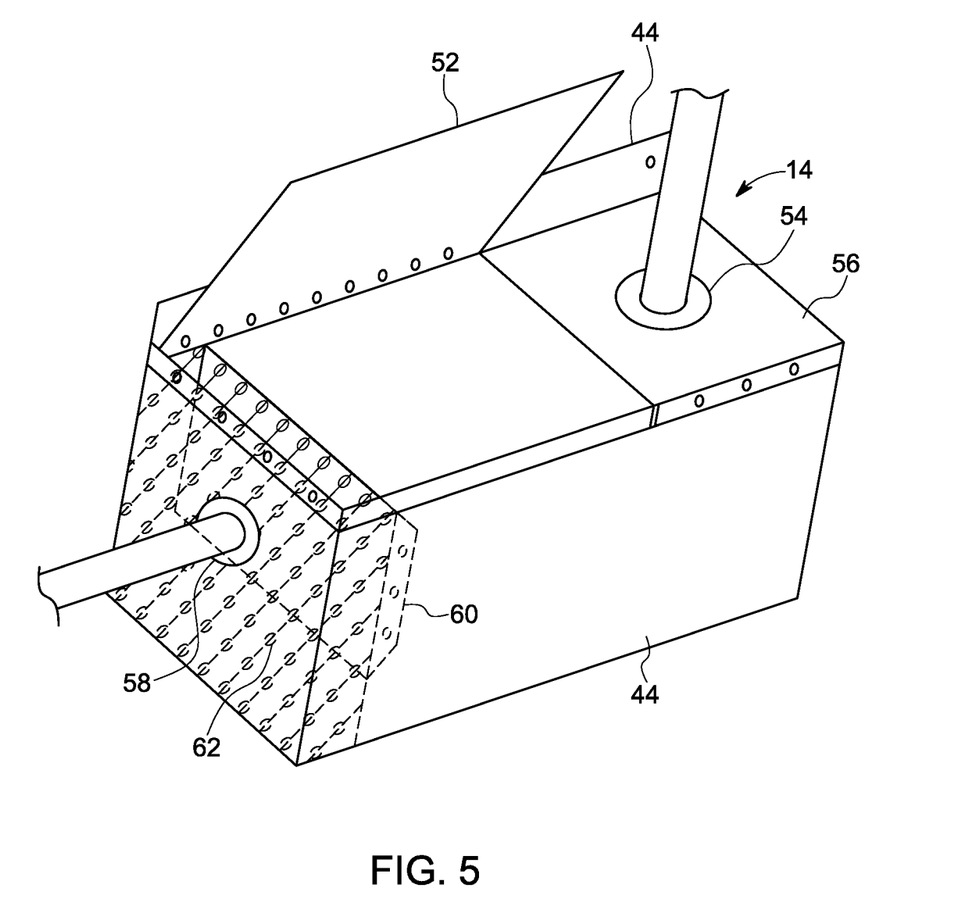
FIG. 5 is a perspective view of a separator box.
Figure 6A:
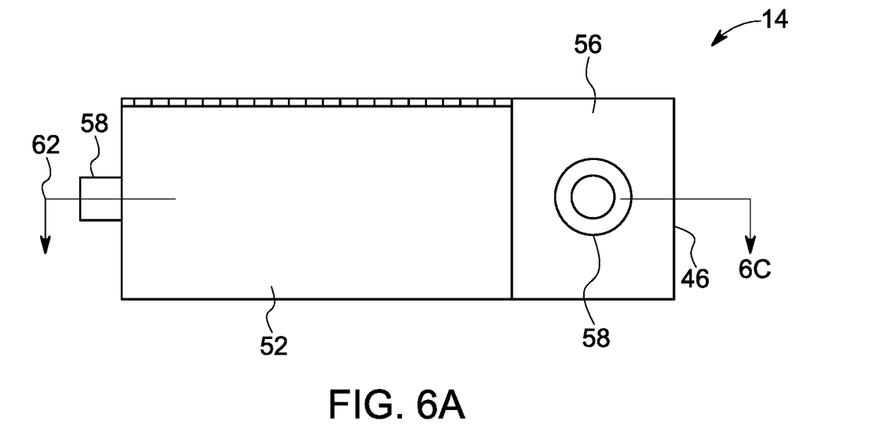
FIG. 6A is a top view of the separator box.
Figure 6B:
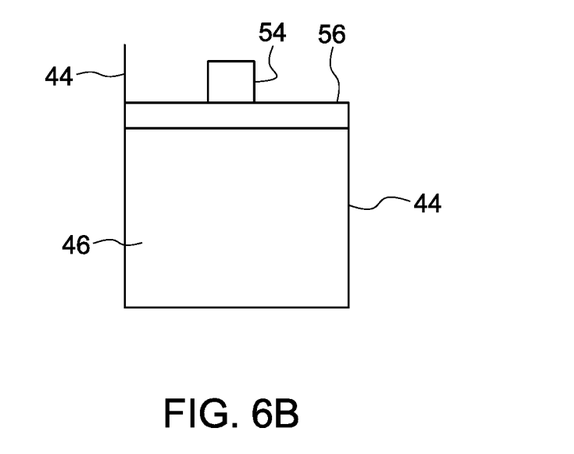
FIG. 6B is an inlet end view of the separator box.
Figure 6C:
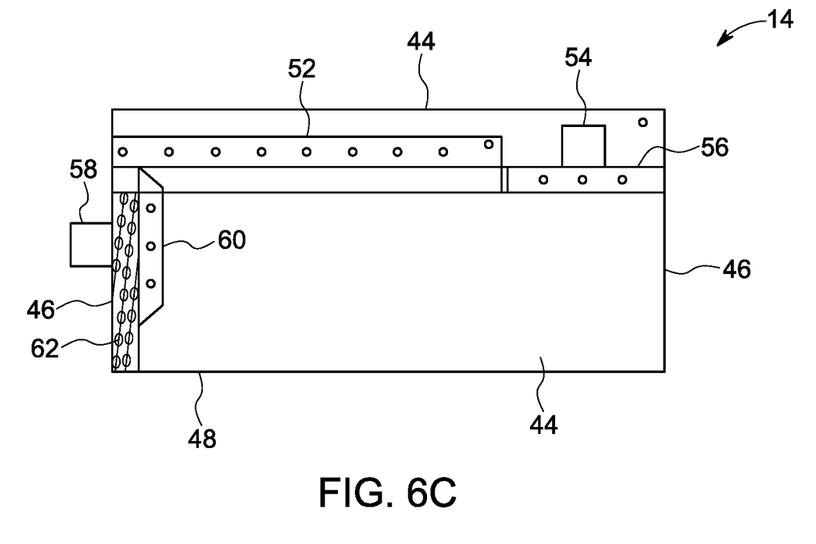
FIG. 6C is a sectional view taken along the plane of 6C-6C in FIG. 6A.
Figure 6D:
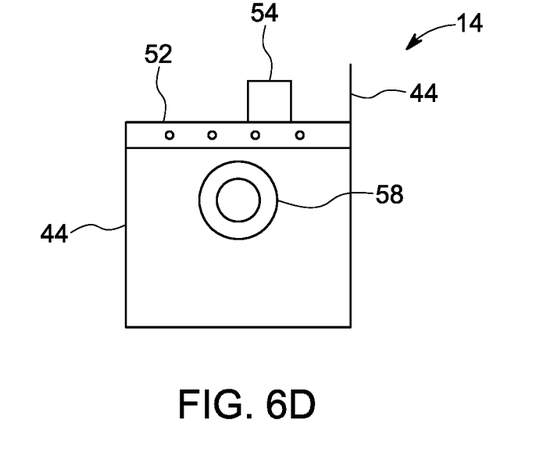
FIG. 6D is an outlet end view of the separator box.

Inside the enclosure forming wash hood 12 there are a plurality of ridges 32 against which baffle-type grease filters 30 are positioned for washing as shown in broken lines in FIG. 4B and further discussed hereinafter. Ridges 32 have an inverted L-shape with a first flat surface 34 aligned with framed opening 26. As shown, the smallest baffle-type grease filters 30 may be positioned on the rear ridge. Whereas, larger baffle-type grease filters 30 are accommodated in the forward ridges. As illustrated ridges 32 are 22" long and 2" high with legs at a 70 degree angle. Ridges 32 are positioned on floor 22 spaced 4" from sidewalls 20 and 4" from front wall 16. A first ridge 32 is preferably 3½ inches from rear wall 18, a second 6½ inches and a third 10 inches. Shorter length ridges 32 should be avoided as a certain amount of flat surface 34 is needed to keep baffle-type grease filters 30 from flipping during washing. A drain hole 38 is positioned in channel 36 around ridges 32.

Figure 2:
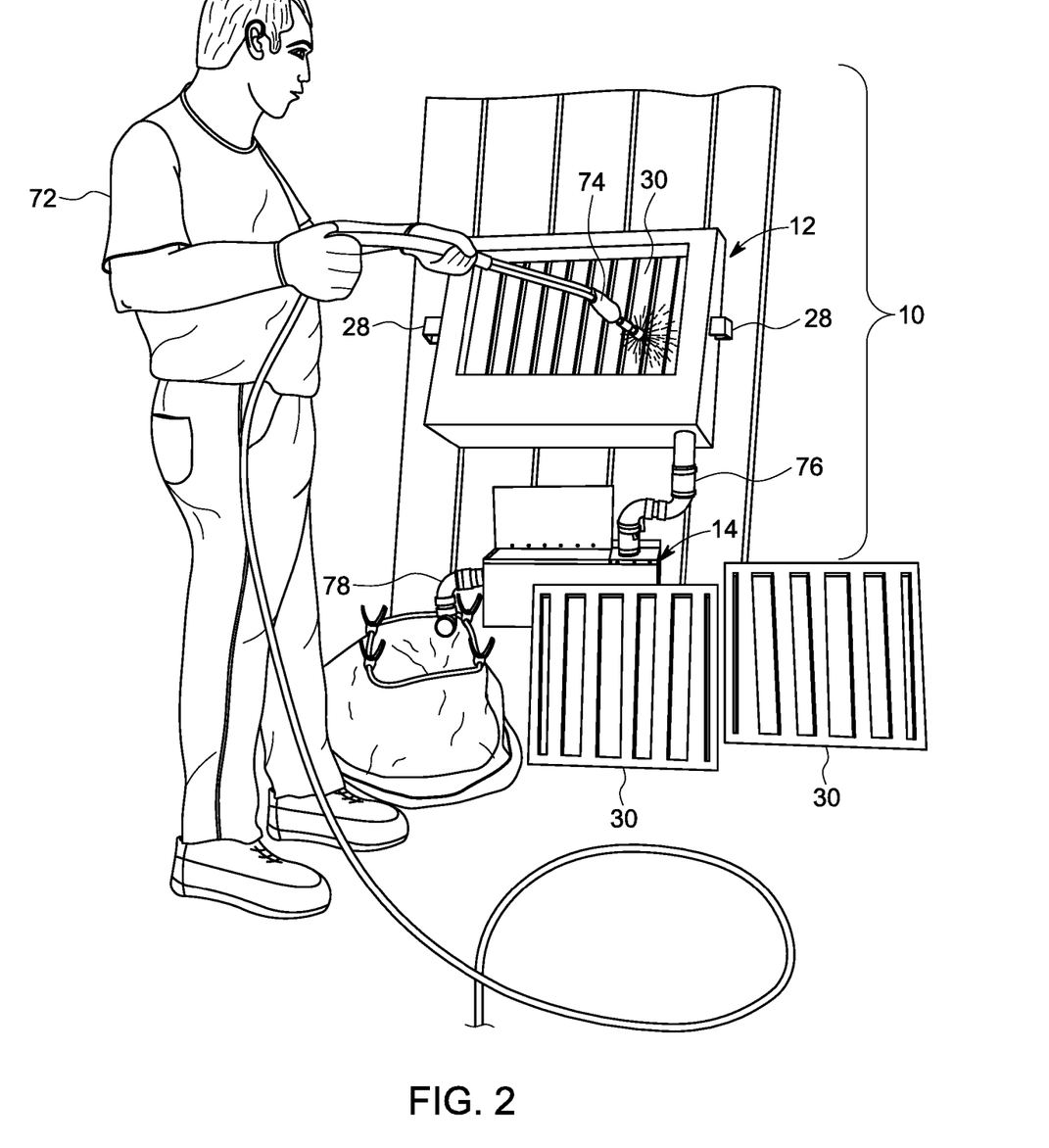
FIG. 2 is perspective view of the pollution control system with water or cleaning solution being sprayed on a baffle-type grease filter contained in the wash hood.
Figure 3:
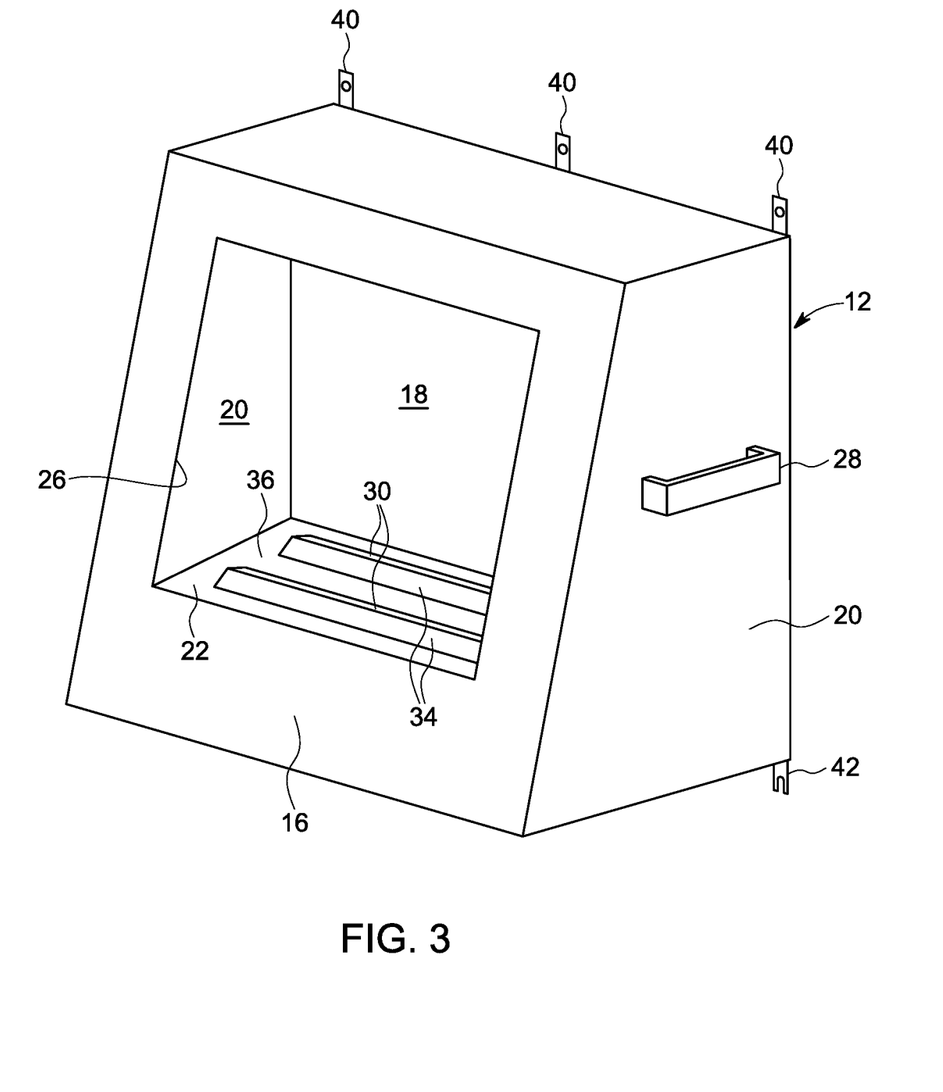
FIG. 3 is a perspective view of the wash hood.

As illustrated in FIGS. 1 and 2, wash hood 12 is hung on a support wall. For this purpose a row of tabs 40, 42 are provided along top and bottom of rear wall 18. Tabs 40 on the top include an aperture for a fastener and tabs 42 at the bottom include a slot for receipt of a fastener previously driven into the wall.

While illustrative specifics are given above for wash hood 12, those skilled in the art will appreciate that other shapes, measurements and other materials of construction (e.g., plastic or aluminum) may be suitable.

With continuing reference to FIGS. 1 and 2, separator box 14 is shown hanging on the wall below wash hood 12. As best seen in FIGS. 5 and 6A-6D, separator box 14 has sidewalls 44, end walls 46, a bottom 48 and a top 50 with a hinged section 52 for cleaning access. An inlet 54 is provided in the unhinged section 56 of top 50 and an outlet 58 is provided in end wall 46 opposite inlet 54. A baffle 60 is attached between sidewalls 44 proximate outlet 58. Baffle 60 extends part way to bottom 48 forming a flow channel through which effluent may flow between inlet 54 and outlet 58 and through a filter 62 provided in the space between baffle 60 and outlet 58. Filter 62 may be formed of natural, synthetic or hybrid fibers shaped into a space fitting pad.

As illustrated in FIGS. 5 and 6A-6D, sidewalls 44 are 14.49" long, a front one of which is 8.06" high. A rear one of sidewalls 44 is 10" high and may have apertures for receipt of fasteners by which separator box 14 may be hung on the wall. End walls 46 measure 4" wide and 5.19" high. Hinged section 52 is 14.49" long with the measurements of the unhinged section 56 and bottom 48 being apparent from the dimensions previously provided. Sidewalls 44, end walls 46, bottom 48 and unhinged section 56 are welded together to form a water tight seal.

Figure 7:
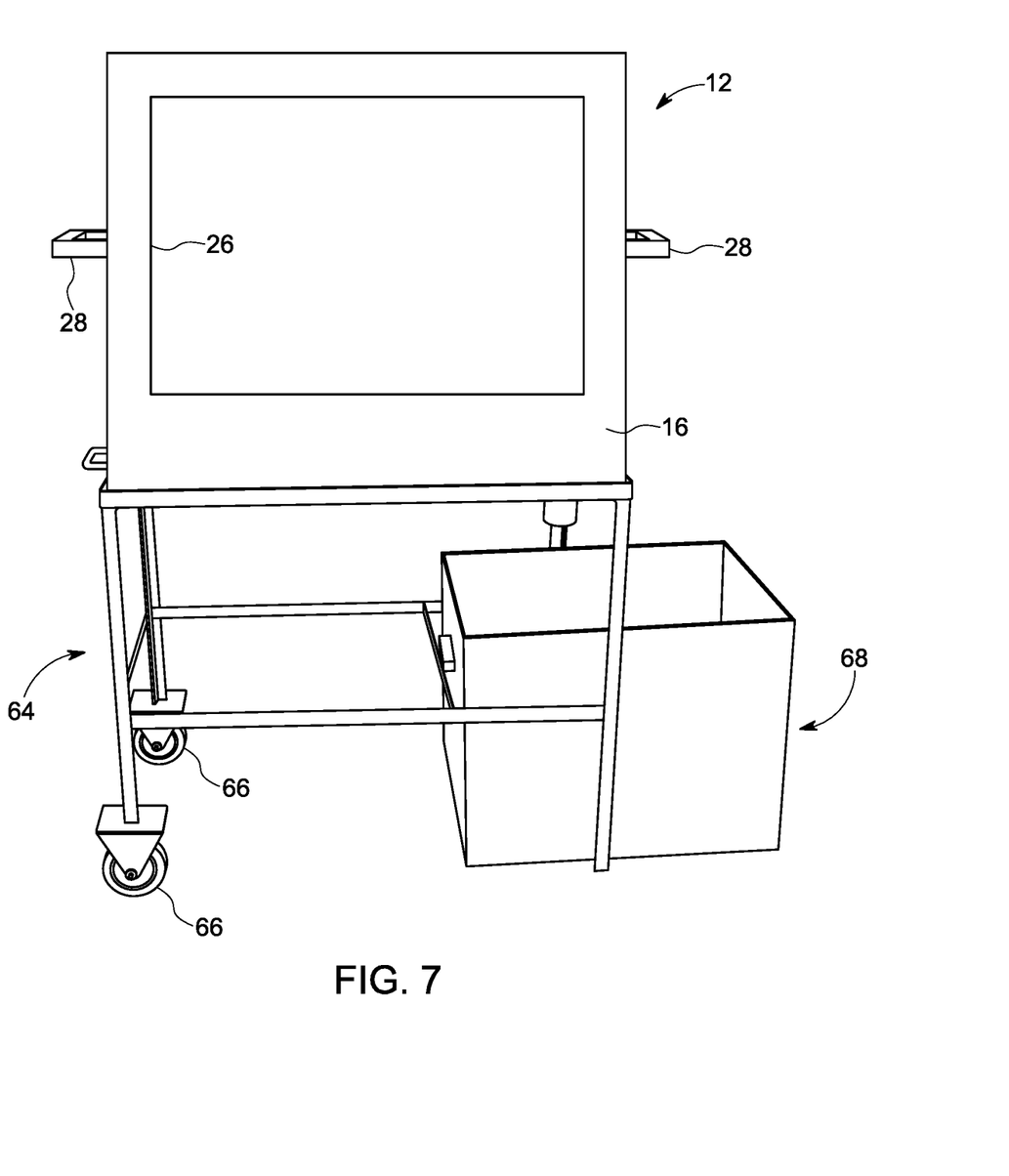
FIG. 7 is a front view of the wash hood mounted on a cart.
Figure 8:
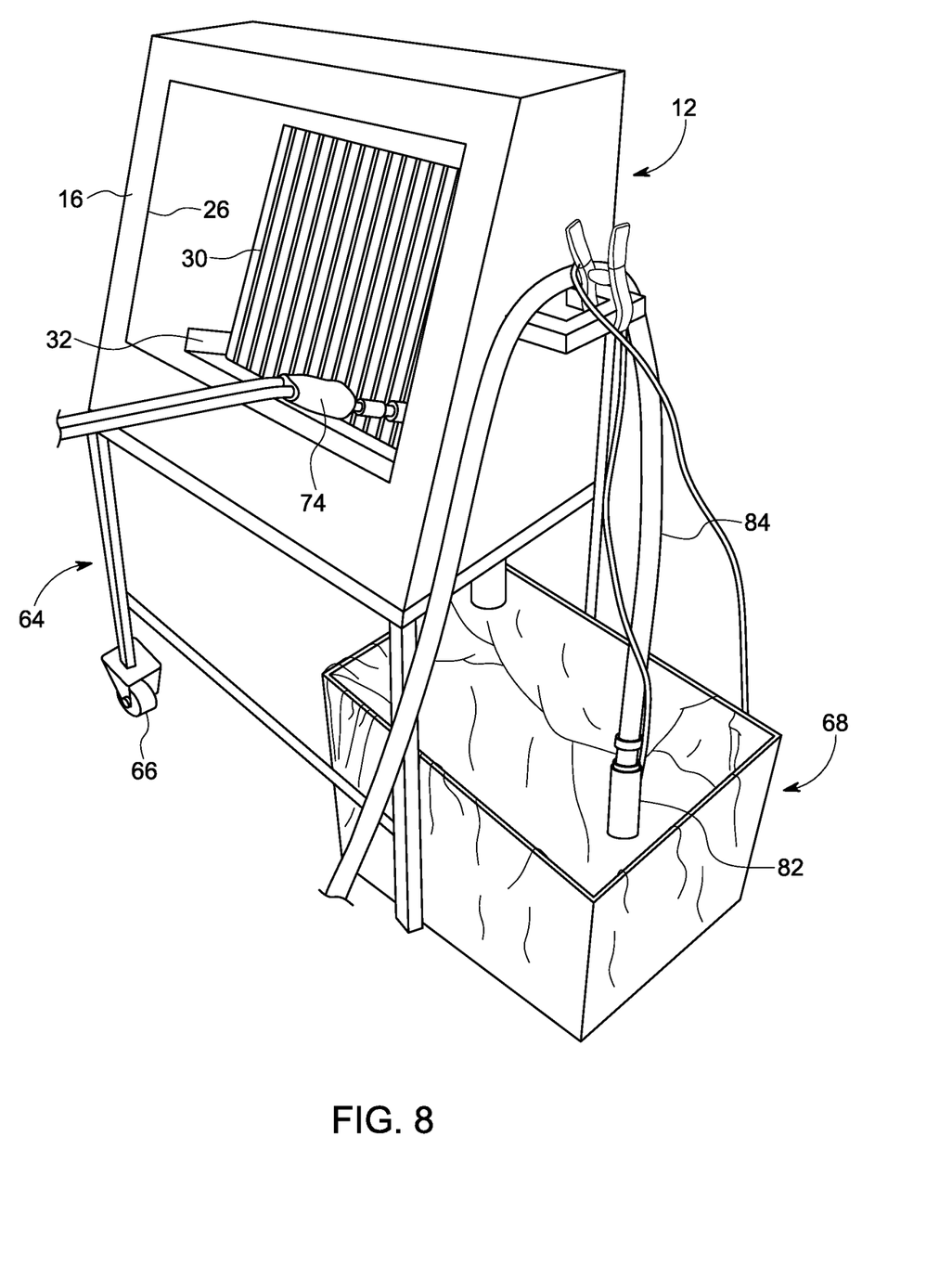
FIG. 8 is a perspective view of the wash hood on the cart with water or cleaning solution being sprayed on a baffle-type grease filter contained in the wash hood.
Figure 10:
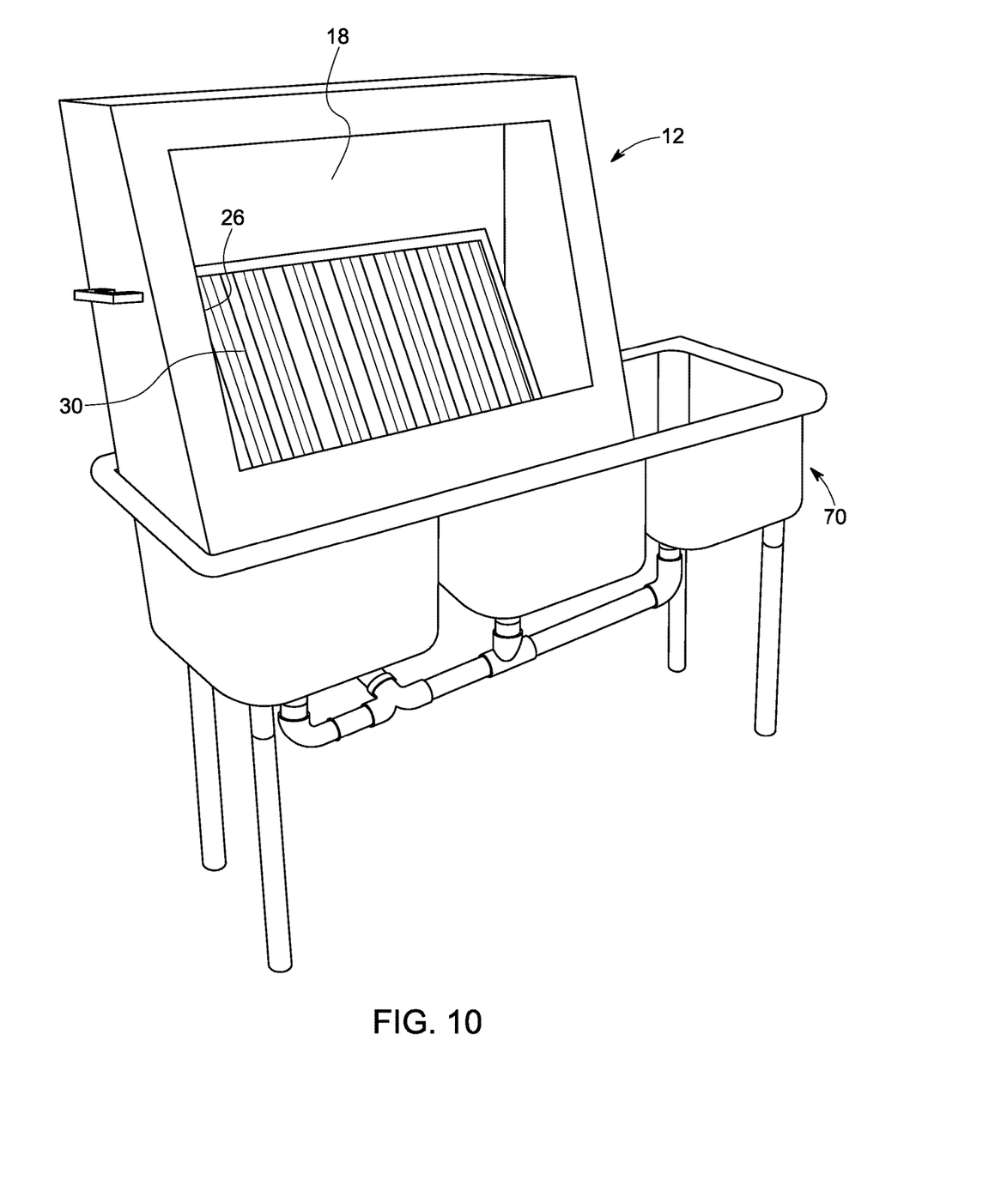
FIG. 10 is a perspective view of the wash box mounted over a sink.

Instead of being mounted on wall as shown in FIGS. 1 and 2, wash hood 12 may be used as a portable unit. As shown in FIGS. 7 and 8, a cart 64 is provided with wheels 66 on one end but not on the other to prevent movement of the cart under high pressure washing. A catch box 68 for effluent is positioned below drain hole 38 in wash hood 12. Wash hood 12 may also be used over a sink 70 as shown in FIG. 10.

In use pollution control system 10 may be used to avoid the contamination of streams as shown in FIG. 11 with greasy wastewater from baffle-type grease filters washed in the parking lot behind a commercial kitchen. As shown in FIGS. 1 and 2, wash hood 12 and separator box 14 may be permanently hung preferably inside the establishment. In operation, wash hood 12 may be used to clean grease laden baffle-type filters 30 by placing them against flat surface 34 of one of ridges 32. Smaller baffle-type grease filters 30 are best leaned against a rear ridge 32 whereas bigger baffle-type grease filters 30 use a front ridge 32.

An operator 72 may then begin to spray the supported baffle-type grease filters with a water hose or with a pressure washer 74. A degreaser such as commonly used in commercial kitchens may be mixed with the water. Unlike when the baffle-type grease filters are lined up against a wall outside and spayed, the frame around opening 26 limits the amount of water that is splashed on the surrounding area and on operator 72.

The effluent (i.e., untreated wastewater) coming off baffle-type grease filters 30 is channeled 36 around ridges 36 and flows out drain hole 38. Because baffle-type grease filters 30 are held at an angle in wash hood 12, the effluent is effectively drained away and substantially none drips off them when they are removed from wash hood 12.

Drain hole 38 is connected a pipe to inlet 54 of separator box 14. As the effluent passes through separator box 14, grease tends to separate from the water which passes through filter 62 and outlet 58. Another pipe 78 receives the filtered water and may deliver it to a mop sink (not shown) connected through a grease trap to a sanitary sewer system but which is simulated in FIGS. 1-2 as a plastic lined catch box 68.

Figure 9:
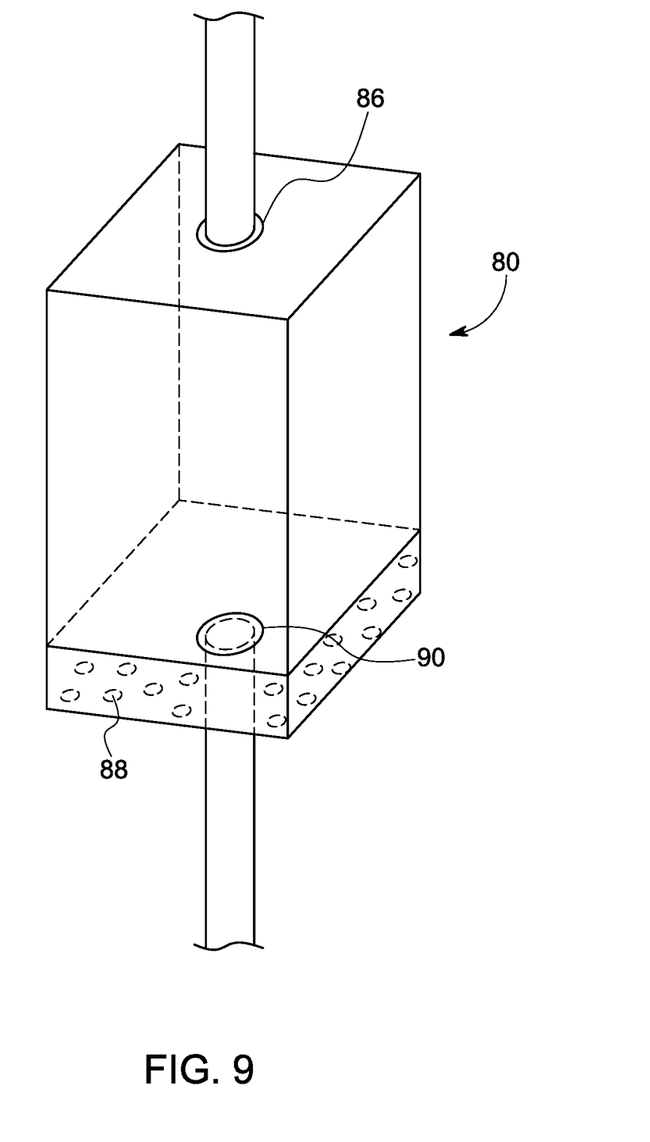
FIG. 9 is a perspective view of a second separator box.

When wash hood 12 is not attached to a wall but operated from a cart as shown in FIGS. 7 and 8, effluent may be passed through drain hole 38 directly into catch box 68 which is preferably lined with a plastic bag. A sump pump 82 connected to a hose 84 may then pass the effluent into a kitchen grease trap (not shown) or into a separator box 80 as shown in FIG. 9 for separating the grease from the water. An inlet 86 of separator box 80 is flowably connected to hose 84 and effluent is gravity flowed through a filter 88 at the bottom of the box and passed through outlet 90. Outlet 90 may be connected by a hose (not shown) to a floor drain or mop sink (not shown) for proper disposal.

When wash hood 12 is used on sink 70 as shown in FIG. 10, a suitably sized separator box 80 receives the effluent from wash hood 12 and separates the grease from the water before passing the water into the sink drain.

From the above, it is seen that the present invention provides a solution to the longstanding and unmet need to clean baffle-type grease filters outside without contaminating the environment or wetting the operator. It also provides a wash system that may be used inside a commercial kitchen through a combination of factors including an effective enclosure of the baffle-type grease filters during cleaning and the substantially complete retention of all the cleaning fluid, effluent and particulate debris for proper disposal.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A system for a treatment of greasy wastewater from power washing a baffle-type grease filter comprising a wash hood for the baffle-type grease filter and a separator box for grease and particulate matter from wash effluent from the baffle-type grease filter, said wash hood comprising an enclosure having a front wall, a rear wall, sidewalls, a floor and a ceiling, said front wall sloped towards the rear wall and having a framed opening which is wider along the floor than along the ceiling and the sidewalls and configured to allow insertion of at least one baffle-type grease filter to be cleaned into the enclosure, a plurality of spaced apart ridges on the floor, each of said ridges having an inverted L-shape with a first flat surface aligned with the framed opening against which a baffle-type grease filter may be leaned, said spaced apart ridges spaced from the front wall, the rear wall and the sidewalls for channeling effluent around the spaced apart ridges; and, a drain hole positioned in the floor for receiving effluent channeled around the spaced apart ridges for disposal through the separator box;

said separator box comprising an enclosure with sidewalls, a bottom and a top, an inlet port in the top connected to the drain hole in the wash hood, and a filter adjacent an outlet port for separating the grease and particulate material in the effluent from the wash hood, a sink connected to a sanitary sewer system, and a grease trap between said sink and said sanitary sewer system, said outlet port in the separator box connected to the sink.

2. The wash hood of claim 1 wherein each of the ridges has an angle of substantially 70 degrees aligned with the front wall.

3. The wash hood of claim 2 wherein the ridges are about 22 inches long and are spaced at least 4 inches from the front wall and sidewalls with a first, second and third ridge being 3½, 6½ and 10 inches from the rear wall, respectively, for channeling effluent around the spaced apart ridges.

4. The wash hood of claim 1 wherein the enclosure and ridges are formed of stainless steel.

5. The wash hood of claim 1 attached to a wall wherein the rear wall has tabs for attaching the wash hood to the wall.

6. The wash hood of claim 1 attached to a cart wherein the floor is configured for mounting the wash hood on the cart.

7. The wash hood of claim 1 wherein the floor is configured for mounting the wash hood over the sink.

8. The system of claim 1 wherein the inlet of the separator box is at a first end of the box and the outlet is at a second end of the box, a baffle attached to the sidewalls with a flow channel formed between the baffle and the bottom, a filter in a space between the baffle and the outlet port.

\* \* \* \* \*